US010510121B2

(12) United States Patent
Allen et al.

(10) Patent No.: US 10,510,121 B2
(45) Date of Patent: Dec. 17, 2019

(54) SYSTEM AND METHOD FOR PERFORMING DWELLING MAINTENANCE ANALYTICS ON INSURED PROPERTY

(71) Applicant: United Services Automobile Association, San Antonio, TX (US)

(72) Inventors: Michael J. Allen, White Salmon, WA (US); Ramsey Devereaux, San Antonio, TX (US); Spencer Read, Helotes, TX (US); David S. Franck, San Antonio, TX (US); Teddy J. Voutour, Holotes, TX (US); William Chandler, San Antonio, TX (US); Michael P. Burns, San Antonio, TX (US); Kathleen L. Swain, Kemah, TX (US); Cleburne R. Burgess, Fair Oaks Ranch, TX (US)

(73) Assignee: United Stated Automobile Association (USAA), San Antonio, TX (US)

(*) Notice: Subject to any disclaimer, the term of this patent is extended or adjusted under 35 U.S.C. 154(b) by 538 days.

(21) Appl. No.: 14/975,254

(22) Filed: Dec. 18, 2015

(65) Prior Publication Data
US 2016/0104250 A1 Apr. 14, 2016

Related U.S. Application Data

(62) Division of application No. 14/273,877, filed on May 9, 2014, now abandoned.
(Continued)

(51) Int. Cl.
G06Q 40/08 (2012.01)
G06Q 10/00 (2012.01)
(Continued)

(52) U.S. Cl.
CPC ......... *G06Q 40/08* (2013.01); *G06K 9/00536* (2013.01); *G06K 9/00637* (2013.01);
(Continued)

(58) Field of Classification Search
CPC .......................................... G06Q 40/00–40/08
(Continued)

(56) References Cited

U.S. PATENT DOCUMENTS 5,182,705 A 1/1993 Barr et al.
5,235,507 A 8/1993 Sackler et al.
(Continued)

FOREIGN PATENT DOCUMENTS

AT 503861 B1 6/2008
CA 2478911 A1 9/2003
(Continued)

OTHER PUBLICATIONS

T. Sanidas et al., U.S. Appl. No. 61/800,561, filed Mar. 15, 2013, Drawings, 9 pages.
(Continued)

Primary Examiner — Narayanswamy Subramanian
(74) Attorney, Agent, or Firm — Fletcher Yoder, P.C.

(57) ABSTRACT

A computer device and method for processing maintenance related data for performing maintenance analytics on insured property. Informatic data is received from one or more sensor devices relating to a property covered by an insurance policy. Analysis is performed on the received informatic data to determine one or more conditions associated with the property. Predefined business rules are applied using the determined one or more conditions associated with the property to determine a maintenance profile for the property indicating one or more of maintenance history and repair or maintenance requirements for the property.

3 Claims, 5 Drawing Sheets

Related U.S. Application Data

(60) Provisional application No. 61/948,192, filed on Mar. 5, 2014, provisional application No. 61/943,906, filed on Feb. 24, 2014, provisional application No. 61/943,901, filed on Feb. 24, 2014, provisional application No. 61/943,897, filed on Feb. 24, 2014, provisional application No. 61/926,532, filed on Jan. 13, 2014, provisional application No. 61/926,534, filed on Jan. 13, 2014, provisional application No. 61/926,541, filed on Jan. 13, 2014, provisional application No. 61/926,536, filed on Jan. 13, 2014, provisional application No. 61/926,095, filed on Jan. 10, 2014, provisional application No. 61/926,098, filed on Jan. 10, 2014, provisional application No. 61/926,091, filed on Jan. 10, 2014, provisional application No. 61/926,093, filed on Jan. 10, 2014, provisional application No. 61/926,114, filed on Jan. 10, 2014, provisional application No. 61/926,103, filed on Jan. 10, 2014, provisional application No. 61/926,111, filed on Jan. 10, 2014, provisional application No. 61/926,108, filed on Jan. 10, 2014, provisional application No. 61/926,123, filed on Jan. 10, 2014, provisional application No. 61/926,121, filed on Jan. 10, 2014, provisional application No. 61/926,119, filed on Jan. 10, 2014, provisional application No. 61/926,118, filed on Jan. 10, 2014, provisional application No. 61/886,779, filed on Aug. 16, 2013.

(51) Int. Cl.
*G06Q 40/02* (2012.01)
*G06K 9/00* (2006.01)

(52) U.S. Cl.
CPC ........... *G06Q 10/20* (2013.01); *G06Q 40/025* (2013.01); *G06Q 2220/00* (2013.01)

(58) Field of Classification Search
USPC ...................................... 705/4, 35
See application file for complete search history.

(56) References Cited

U.S. PATENT DOCUMENTS

| | | |
|---|---|---|
| 5,325,291 A | 6/1994 | Garrett et al. |
| 5,526,609 A | 6/1996 | Lee et al. |
| 5,724,261 A | 3/1998 | Denny et al. |
| 5,950,169 A | 9/1999 | Borghesi et al. |
| 5,960,338 A | 9/1999 | Foti |
| 5,991,733 A | 11/1999 | Aleia et al. |
| 6,029,141 A | 2/2000 | Bezos et al. |
| 6,049,773 A | 4/2000 | McCormack et al. |
| 6,141,686 A | 10/2000 | Jackowski et al. |
| 6,526,807 B1 | 3/2003 | Doumit et al. |
| 6,686,838 B1 | 2/2004 | Rezvani et al. |
| 6,766,322 B1 | 7/2004 | Bell |
| 6,826,607 B1 | 11/2004 | Gelvin et al. |
| 6,985,907 B2 | 1/2006 | Zambo et al. |
| 7,015,789 B1 | 3/2006 | Helgeson |
| 7,138,914 B2 | 11/2006 | Culpepper et al. |
| 7,142,099 B2 | 11/2006 | Ross et al. |
| 7,170,418 B2 | 1/2007 | Rose-Pehrsson et al. |
| 7,203,654 B2 | 4/2007 | Menendez |
| 7,398,218 B1 | 7/2008 | Bemaski et al. |
| 7,406,436 B1 | 7/2008 | Reisman |
| 7,602,196 B2 | 10/2009 | Vokey |
| 7,610,210 B2 | 10/2009 | Helitzer et al. |
| 7,624,031 B2 | 11/2009 | Simpson et al. |
| 7,624,069 B2 | 11/2009 | Padgette |
| 7,711,584 B2 | 5/2010 | Helitzer et al. |
| 7,716,076 B1 | 5/2010 | Block et al. |
| 7,739,133 B1 | 6/2010 | Hail et al. |
| 7,809,587 B2 | 10/2010 | Dorai et al. |
| 7,869,944 B2 | 1/2011 | Deaton et al. |
| 7,885,831 B2 | 2/2011 | Burton et al. |
| 7,899,560 B2 | 3/2011 | Eck |
| 7,937,437 B2 | 5/2011 | Fujii |
| 7,945,497 B2 | 5/2011 | Kenefick et al. |
| 7,949,548 B2 | 5/2011 | Mathai et al. |
| 7,958,184 B2 | 6/2011 | Barsness et al. |
| 7,969,296 B1 | 6/2011 | Stell |
| 8,004,404 B2 | 8/2011 | Izumi et al. |
| 8,041,636 B1 | 10/2011 | Hunter et al. |
| 8,046,243 B2 | 10/2011 | Winkler |
| 8,069,181 B1 | 11/2011 | Krishnan et al. |
| 8,081,795 B2 | 12/2011 | Brown |
| 8,086,523 B1 | 12/2011 | Palmer |
| 8,090,598 B2 | 1/2012 | Bauer et al. |
| 8,095,394 B2 | 1/2012 | Nowak et al. |
| 8,103,527 B1 | 1/2012 | Lasalle et al. |
| 8,106,769 B1 | 1/2012 | Maroney et al. |
| 8,229,767 B2 | 7/2012 | Birchall |
| 8,249,968 B1 | 8/2012 | Oldham et al. |
| 8,265,963 B1 | 9/2012 | Hanson et al. |
| 8,271,303 B2 | 9/2012 | Helitzer et al. |
| 8,271,308 B2 | 9/2012 | Winkler |
| 8,271,321 B1 | 9/2012 | Kestenbaum |
| 8,289,160 B1 | 10/2012 | Billman |
| 8,294,567 B1 | 10/2012 | Stell |
| 8,306,258 B2 * | 11/2012 | Brown ................. G06K 9/0063 382/100 |
| 8,332,242 B1 | 12/2012 | Medina, III |
| 8,332,348 B1 | 12/2012 | Avery |
| 8,384,538 B2 | 2/2013 | Breed |
| 8,400,299 B1 | 3/2013 | Maroney et al. |
| 8,428,972 B1 | 4/2013 | Noles et al. |
| 8,452,678 B2 | 5/2013 | Feldman et al. |
| 8,510,196 B1 | 8/2013 | Brandmaier et al. |
| 8,515,788 B2 | 8/2013 | Tracy et al. |
| 8,521,542 B1 | 8/2013 | Stotts |
| 852,665 A1 | 9/2013 | Trundle et al. |
| 8,527,306 B1 | 9/2013 | Reeser et al. |
| 8,600,104 B2 * | 12/2013 | Brown ................. G06K 9/0063 382/100 |
| 8,635,091 B2 | 1/2014 | Amigo et al. |
| 8,638,228 B2 | 1/2014 | Amigo et al. |
| 8,650,048 B1 | 2/2014 | Hopkins, III et al. |
| 8,676,612 B2 | 3/2014 | Helitzer et al. |
| 8,719,061 B2 | 5/2014 | Birchall |
| 8,731,975 B2 | 5/2014 | English et al. |
| 8,760,285 B2 | 6/2014 | Billman et al. |
| 8,774,525 B2 | 7/2014 | Pershing |
| 8,782,395 B1 | 7/2014 | Ly |
| 8,788,299 B1 | 7/2014 | Medina, III |
| 8,788,301 B1 | 7/2014 | Marlow et al. |
| 8,799,034 B1 | 8/2014 | Brandmaier et al. |
| 8,812,414 B2 | 8/2014 | Arthur et al. |
| 8,813,065 B2 | 8/2014 | Zygmuntowicz et al. |
| 8,868,541 B2 | 10/2014 | Lin et al. |
| 8,872,818 B2 | 10/2014 | Freeman et al. |
| 8,910,298 B2 | 12/2014 | Gettings et al. |
| 8,924,241 B2 | 12/2014 | Grosso |
| 8,930,581 B2 | 1/2015 | Anton et al. |
| 9,015,238 B1 | 4/2015 | Anton et al. |
| 9,049,168 B2 | 6/2015 | Jacob et al. |
| 9,053,516 B2 | 6/2015 | Stempora |
| 9,082,015 B2 | 7/2015 | Christopulos et al. |
| 9,141,995 B1 | 9/2015 | Brinkmann et al. |
| 9,158,869 B2 | 10/2015 | Labrie et al. |
| 9,165,084 B2 | 10/2015 | Isberg et al. |
| 9,183,560 B2 | 11/2015 | Abelow |
| 9,252,980 B2 | 2/2016 | Raman |
| 9,311,676 B2 | 4/2016 | Helitzer et al. |
| 9,330,550 B2 | 5/2016 | Zribi et al. |
| 9,363,322 B1 | 6/2016 | Anton et al. |
| 9,424,606 B2 | 8/2016 | Wilson, II et al. |
| 9,454,907 B2 | 9/2016 | Hafeez et al. |
| 9,460,471 B2 | 10/2016 | Bernard et al. |
| 9,481,459 B2 | 11/2016 | Staskevich et al. |
| 9,611,038 B2 | 4/2017 | Dahlstrom |

(56) References Cited

U.S. PATENT DOCUMENTS

| | | |
|---|---|---|
| 9,613,523 B2 | 4/2017 | Davidson et al. |
| 9,652,805 B1 | 5/2017 | Clawson, II et al. |
| 9,665,074 B2 | 5/2017 | Lentzitzky |
| 9,710,858 B1 | 7/2017 | Devereaux et al. |
| 9,747,571 B2 | 8/2017 | Ballew et al. |
| 9,754,325 B1 | 9/2017 | Konrardy et al. |
| 9,792,656 B1 | 10/2017 | Konrardy et al. |
| 9,811,862 B1 | 11/2017 | Allen et al. |
| 9,818,158 B1 | 11/2017 | Devereaux et al. |
| 9,842,310 B2 | 12/2017 | Lekas |
| 9,886,723 B1 | 2/2018 | Devereaux et al. |
| 9,892,463 B1 | 2/2018 | Hakimi-Boushehri et al. |
| 9,934,675 B2 | 4/2018 | Coyne et al. |
| 9,947,051 B1 | 4/2018 | Allen et al. |
| 9,959,581 B2 | 5/2018 | Pershing |
| 9,984,417 B1 | 5/2018 | Allen et al. |
| 10,032,224 B2* | 7/2018 | Helitzer .............. G06Q 40/08 |
| 10,055,793 B1 | 8/2018 | Call et al. |
| 10,055,794 B1 | 8/2018 | Konrardy et al. |
| 10,121,207 B1 | 11/2018 | Devereaux et al. |
| 10,163,162 B1 | 12/2018 | Devereaux et al. |
| 10,181,159 B1 | 1/2019 | Allen et al. |
| 2002/0007289 A1 | 1/2002 | Malin et al. |
| 2002/0032586 A1 | 3/2002 | Joao |
| 2002/0035528 A1 | 3/2002 | Simpson et al. |
| 2002/0049618 A1 | 4/2002 | McClure et al. |
| 2002/0055861 A1* | 5/2002 | King .................. G06Q 10/10 705/4 |
| 2002/0087364 A1 | 7/2002 | Lemer et al. |
| 2002/0103622 A1 | 8/2002 | Burge |
| 2002/0111835 A1 | 8/2002 | Hele et al. |
| 2002/0116254 A1 | 8/2002 | Stein et al. |
| 2002/0129001 A1 | 9/2002 | Levkoff et al. |
| 2002/0178033 A1 | 11/2002 | Yoshioka et al. |
| 2003/0040934 A1* | 2/2003 | Skidmore ............ G06Q 10/10 705/4 |
| 2003/0078816 A1 | 4/2003 | Filep |
| 2003/0097335 A1 | 5/2003 | Moskowitz et al. |
| 2003/0182441 A1 | 9/2003 | Andrew et al. |
| 2004/0019507 A1 | 1/2004 | Yaruss et al. |
| 2004/0034657 A1 | 2/2004 | Zambo et al. |
| 2004/0039586 A1 | 2/2004 | Garvey et al. |
| 2004/0046033 A1 | 3/2004 | Kolodziej et al. |
| 2004/0064345 A1 | 4/2004 | Ajamian et al. |
| 2004/0148204 A1 | 7/2004 | Menendez |
| 2004/0172304 A1 | 9/2004 | Joao |
| 2004/0181621 A1 | 9/2004 | Mathur et al. |
| 2004/0260406 A1 | 12/2004 | Ljunggren et al. |
| 2005/0050017 A1 | 3/2005 | Ross et al. |
| 2005/0055248 A1* | 3/2005 | Helitzer .............. G06Q 40/08 705/4 |
| 2005/0055249 A1* | 3/2005 | Helitzer .............. G06Q 40/08 705/4 |
| 2005/0057365 A1 | 3/2005 | Qualey |
| 2005/0128074 A1 | 6/2005 | Culpepper et al. |
| 2005/0197847 A1 | 9/2005 | Smith |
| 2005/0226273 A1 | 10/2005 | Qian |
| 2005/0251427 A1 | 11/2005 | Dorai et al. |
| 2005/0278082 A1 | 12/2005 | Weekes |
| 2006/0017558 A1 | 1/2006 | Albert et al. |
| 2006/0026044 A1 | 2/2006 | Smith |
| 2006/0052905 A1 | 3/2006 | Pfingsten et al. |
| 2006/0111874 A1 | 5/2006 | Curtis et al. |
| 2006/0200008 A1 | 9/2006 | Moore-Ede |
| 2006/0218018 A1 | 9/2006 | Schmitt |
| 2006/0219705 A1 | 10/2006 | Beier et al. |
| 2006/0229923 A1 | 10/2006 | Adi et al. |
| 2006/0235611 A1 | 10/2006 | Deaton et al. |
| 2007/0005400 A1 | 1/2007 | Eggenberger et al. |
| 2007/0005404 A1 | 1/2007 | Raz et al. |
| 2007/0043803 A1 | 2/2007 | Whitehouse et al. |
| 2007/0088579 A1 | 4/2007 | Richards |
| 2007/0100669 A1 | 5/2007 | Wargin et al. |
| 2007/0118399 A1 | 5/2007 | Avinash et al. |
| 2007/0136078 A1 | 6/2007 | Plante |
| 2007/0150319 A1* | 6/2007 | Menendez ............ G06Q 40/00 705/4 |
| 2007/0156463 A1 | 7/2007 | Burton et al. |
| 2007/0161940 A1 | 7/2007 | Blanchard et al. |
| 2007/0174467 A1 | 7/2007 | Ballou et al. |
| 2007/0214023 A1 | 9/2007 | Mathai et al. |
| 2007/0282639 A1 | 12/2007 | Leszuk et al. |
| 2007/0299677 A1* | 12/2007 | Maertz ................ G06Q 10/00 705/305 |
| 2008/0033847 A1 | 2/2008 | McIntosh |
| 2008/0052134 A1 | 2/2008 | Nowak et al. |
| 2008/0065427 A1 | 3/2008 | Helitzer et al. |
| 2008/0077451 A1 | 3/2008 | Anthony et al. |
| 2008/0086320 A1 | 4/2008 | Ballew et al. |
| 2008/0114655 A1 | 5/2008 | Skidmore |
| 2008/0140857 A1 | 6/2008 | Conner et al. |
| 2008/0154651 A1 | 6/2008 | Kenefick et al. |
| 2008/0154686 A1 | 6/2008 | Vicino |
| 2008/0154851 A1 | 6/2008 | Jean |
| 2008/0154886 A1 | 6/2008 | Podowski et al. |
| 2008/0164769 A1 | 7/2008 | Eck |
| 2008/0243558 A1 | 10/2008 | Gupte |
| 2008/0244329 A1 | 10/2008 | Shinbo et al. |
| 2008/0282817 A1 | 11/2008 | Breed |
| 2008/0306799 A1 | 12/2008 | Sopko et al. |
| 2008/0307104 A1 | 12/2008 | Amini et al. |
| 2008/0319787 A1 | 12/2008 | Stivoric et al. |
| 2009/0006175 A1* | 1/2009 | Maertz ................ G06Q 30/0236 705/80 |
| 2009/0024420 A1 | 1/2009 | Winkler |
| 2009/0031175 A1 | 1/2009 | Aggarwal et al. |
| 2009/0109037 A1 | 4/2009 | Farmer |
| 2009/0119132 A1 | 5/2009 | Bolano et al. |
| 2009/0135009 A1 | 5/2009 | Little et al. |
| 2009/0177500 A1 | 7/2009 | Swahn |
| 2009/0188202 A1 | 7/2009 | Vokey |
| 2009/0205054 A1 | 8/2009 | Blotenberg et al. |
| 2009/0216349 A1 | 8/2009 | Kwon et al. |
| 2009/0240531 A1 | 9/2009 | Hilborn |
| 2009/0240550 A1 | 9/2009 | McCarty |
| 2009/0265193 A1* | 10/2009 | Collins .............. G06Q 30/0185 705/4 |
| 2009/0265207 A1 | 10/2009 | Johnson |
| 2009/0266565 A1 | 10/2009 | Char |
| 2009/0279734 A1 | 11/2009 | Brown |
| 2009/0287509 A1 | 11/2009 | Basak et al. |
| 2010/0030586 A1 | 2/2010 | Taylor et al. |
| 2010/0049552 A1 | 2/2010 | Fini et al. |
| 2010/0131300 A1 | 5/2010 | Collopy et al. |
| 2010/0131307 A1 | 5/2010 | Collopy et al. |
| 2010/0174566 A1 | 7/2010 | Helitzer et al. |
| 2010/0241464 A1 | 9/2010 | Amigo et al. |
| 2010/0274590 A1 | 10/2010 | Compangano et al. |
| 2010/0274859 A1 | 10/2010 | Bucuk |
| 2010/0299161 A1 | 11/2010 | Burdick et al. |
| 2010/0299162 A1 | 11/2010 | Kwan |
| 2011/0043958 A1 | 2/2011 | Nakamura et al. |
| 2011/0061697 A1 | 3/2011 | Behrenbruch et al. |
| 2011/0112848 A1 | 5/2011 | Beraja et al. |
| 2011/0137684 A1 | 6/2011 | Peak et al. |
| 2011/0137685 A1 | 6/2011 | Tracy et al. |
| 2011/0137885 A1 | 6/2011 | Isberg et al. |
| 2011/0161117 A1 | 6/2011 | Busque et al. |
| 2011/0161119 A1 | 6/2011 | Collins |
| 2011/0295624 A1 | 12/2011 | Chapin et al. |
| 2011/0320226 A1 | 12/2011 | Graziano et al. |
| 2012/0004935 A1 | 1/2012 | Winkler |
| 2012/0016695 A1 | 1/2012 | Bernard et al. |
| 2012/0022897 A1 | 1/2012 | Shafer |
| 2012/0025994 A1 | 2/2012 | Morris |
| 2012/0028635 A1 | 2/2012 | Borg et al. |
| 2012/0028835 A1 | 2/2012 | Wild et al. |
| 2012/0046975 A1 | 2/2012 | Stolze |
| 2012/0072240 A1 | 3/2012 | Grosso et al. |
| 2012/0096149 A1 | 4/2012 | Sunkara et al. |
| 2012/0101855 A1 | 4/2012 | Collins et al. |
| 2012/0116820 A1 | 5/2012 | English et al. |
| 2012/0130751 A1 | 5/2012 | McHugh et al. |
| 2012/0143634 A1 | 6/2012 | Beyda et al. |

(56) References Cited

U.S. PATENT DOCUMENTS

| | | |
|---|---|---|
| 2012/0158436 A1 | 6/2012 | Bauer et al. |
| 2012/0176237 A1 | 7/2012 | Tabe |
| 2012/0215568 A1 | 8/2012 | Vahidi et al. |
| 2012/0290333 A1 | 11/2012 | Birchall |
| 2012/0311053 A1 | 12/2012 | Labrie et al. |
| 2012/0311614 A1 | 12/2012 | DeAnna et al. |
| 2012/0323609 A1 | 12/2012 | Fini |
| 2013/0006608 A1 | 1/2013 | Dehors et al. |
| 2013/0018936 A1 | 1/2013 | DAmico et al. |
| 2013/0040636 A1 | 2/2013 | Borg et al. |
| 2013/0040836 A1 | 2/2013 | Himmler et al. |
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0144658 A1 | 6/2013 | Schnabolk et al. |
| 2013/0144858 A1 | 6/2013 | Lin et al. |
| 2013/0182002 A1 | 7/2013 | MacCiola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |
| 2013/0226623 A1 | 8/2013 | Diana et al. |
| 2013/0226624 A1 | 8/2013 | Blessman et al. |
| 2013/0245796 A1 | 9/2013 | Lentzitzky et al. |
| 2013/0253961 A1 | 9/2013 | Feldman et al. |
| 2013/0268358 A1 | 10/2013 | Haas |
| 2013/0282408 A1 | 10/2013 | Snyder et al. |
| 2013/0317732 A1 | 11/2013 | Borg et al. |
| 2014/0040343 A1 | 2/2014 | Nickolov et al. |
| 2014/0046701 A1 | 2/2014 | Steinberg et al. |
| 2014/0050147 A1 | 2/2014 | Beale |
| 2014/0058761 A1 | 2/2014 | Freiberger et al. |
| 2014/0067137 A1 | 3/2014 | Amelio et al. |
| 2014/0081675 A1 | 3/2014 | Ives et al. |
| 2014/0089156 A1 | 3/2014 | Williams et al. |
| 2014/0089990 A1 | 3/2014 | van Deventer et al. |
| 2014/0108275 A1 | 4/2014 | Heptonstall |
| 2014/0114693 A1 | 4/2014 | Helitzer et al. |
| 2014/0114893 A1 | 4/2014 | Arthur et al. |
| 2014/0123292 A1 | 5/2014 | Schmidt et al. |
| 2014/0123309 A1 | 5/2014 | Jung et al. |
| 2014/0132409 A1 | 5/2014 | Billman et al. |
| 2014/0136242 A1 | 5/2014 | Weekes et al. |
| 2014/0142989 A1 | 5/2014 | Grosso |
| 2014/0149485 A1 | 5/2014 | Sharma et al. |
| 2014/0180723 A1 | 6/2014 | Cote et al. |
| 2014/0192646 A1 | 7/2014 | Mir et al. |
| 2014/0195272 A1 | 7/2014 | Sadiq et al. |
| 2014/0201072 A1 | 7/2014 | Reeser et al. |
| 2014/0201315 A1 | 7/2014 | Jacob et al. |
| 2014/0214458 A1 | 7/2014 | Vahidi et al. |
| 2014/0257862 A1 | 9/2014 | Billman et al. |
| 2014/0257863 A1 | 9/2014 | Maastricht et al. |
| 2014/0266669 A1 | 9/2014 | Fadell et al. |
| 2014/0270492 A1 | 9/2014 | Christopulos et al. |
| 2014/0278573 A1 | 9/2014 | Cook |
| 2014/0279593 A1 | 9/2014 | Pershing |
| 2014/0280457 A1 | 9/2014 | Anton et al. |
| 2014/0304007 A1 | 10/2014 | Kimball et al. |
| 2014/0316614 A1 | 10/2014 | Newman |
| 2014/0322676 A1 | 10/2014 | Raman |
| 2014/0327995 A1 | 11/2014 | Panjwani et al. |
| 2014/0334492 A1 | 11/2014 | Mack-Crane |
| 2014/0358592 A1 | 12/2014 | Wedig et al. |
| 2014/0371941 A1 | 12/2014 | Keller et al. |
| 2014/0375440 A1 | 12/2014 | Rezvani et al. |
| 2014/0380264 A1 | 12/2014 | Misra et al. |
| 2015/0006206 A1 | 1/2015 | Mdeway |
| 2015/0019266 A1 | 1/2015 | Stempora |
| 2015/0025915 A1 | 1/2015 | Lekas |
| 2015/0025917 A1 | 1/2015 | Stempora |
| 2015/0026074 A1 | 1/2015 | Cotten |
| 2015/0112504 A1 | 4/2015 | Binion et al. |
| 2015/0154709 A1 | 6/2015 | Cook |
| 2015/0154712 A1 | 6/2015 | Cook |
| 2015/0161738 A1 | 6/2015 | Stempora |
| 2015/0221051 A1 | 8/2015 | Settino |
| 2015/0332407 A1 | 11/2015 | Wilson et al. |
| 2015/0339911 A1 | 11/2015 | Coyne et al. |
| 2015/0370272 A1 | 12/2015 | Reddy et al. |
| 2015/0372832 A1 | 12/2015 | Kortz et al. |
| 2016/0005130 A1 | 1/2016 | Devereaux et al. |
| 2016/0039921 A1 | 2/2016 | Luo et al. |
| 2016/0055594 A1 | 2/2016 | Emison |
| 2016/0067547 A1 | 3/2016 | Anthony et al. |
| 2016/0104250 A1 | 4/2016 | Allen et al. |
| 2016/0125170 A1 | 5/2016 | Abramowitz |
| 2016/0163186 A1 | 6/2016 | Davidson et al. |
| 2016/0225098 A1 | 8/2016 | Helitzer et al. |
| 2017/0178424 A1 | 6/2017 | Wright |
| 2017/0365008 A1 | 12/2017 | Schreier et al. |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 722145 A1 | 7/1996 |
| EP | 0722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013036677 A1 | 3/2013 |

OTHER PUBLICATIONS

T. Sanidas et al., U.S. Appl. No. 61/800,561, filed Mar. 15, 2013, Specification, 19 pages.

"After an Auto Accident: Understanding the Claims Process," Financial Services Commission on Ontario, 2011, 10 pages.

"Truck Crash Event Data Recorder Downloading," Crash Forensic; 2012, pp. 1-25.

Aiyagari, Sanjay et al., "AMQP Message Queuing Protocol Specification," Version Dec. 9, 2006, https://www.rabbitmq.com/resources/specs/amqp0-9.

Amanda Love, "How Recoverable Depreciation Works", Aug. 6, 2012, http://www.stateroofingtexas.com/ recoverable-depreciation-works/.

AMQP is the Internet Protocol for Business Messaging Website. Jul. 4, 2011. https://web.archive.org/ web/20110704212632/http://www.amqp.org/about/what.

Cloudera.com, "Migrating from MapReduce 1 (MRv1) to Map Reduce 2 (MRv2, YARN)", https://www.cloudera.com/ documentation/enterprise/5-9-x/topics/cdh_ig_mapreduce_to_yam_migrate.html, page generated Feb. 6, 2018.

Corbett et al., "Spanner: Google's Globally-Distributed Database," Google, Inc., pp. 1-14, 2012.

Das, Sudipto et al., "Ricardo: Integrating R and Hadoop," IBM Almaden Research Center, SIGMOD'10, Jun. 6-11, 2010.

Dean et al., " A New Age of Data Mining in the High-Performance World," SAS Institute Inc., 2012.

Deerwester et al., "Indexing by Latent Semantic Analysis," Journal of the American Society for Information Science, 1990.41 (6), pp. 391-407.

Farmers Next Generation Homeowners Policy, Missouri, by Farmers insurance Exchange; 2008; 50 pages.

(56) References Cited

OTHER PUBLICATIONS

Fong et al., "Toward a scale-out data-management middleware for low-latency enterprise computing," IBM J. RES & DEV. vol. 57, No. 3/4 Paper, 6 May/Jul. 2013.
Glennon, Jr., John C.; "Motor Vehicle Crash Investigation and Reconstruction," BSAT, 2001, 4 pages.
Gonzalez Ribeiro, Ana, "Surprising things your home insurance covers," Jan. 12, 2012 in Insurance; 4 pages.
Hopkins, Brian, "Big Opportunities in Big Data Positioning Your Firm to Capitalize in a Sea of Information," Enterprise Architecture Professionals, Forrester Research, Inc., pp. 1-9, May, 2011.
Iwasaki, Yoji; Yamazaki, Fumimo, Publication Info: 32nd Asian Conference on Remote Sensing 2011, ACRS 2011 1: 550-555. Asian Association on Remote Sensing. (Dec. 1, 2011) (Year: 2011).
Kopp et al., "Full-scale testing of low-rise, residential buildings with realistic wind loads", 2012, 15 pages.
McKeown et al., "OpenFlow: Enabling Innovation in Campus Networks," pp. 1-6, Mar. 14, 2008.
Melnik, Sergey et al., "Dremel: Interactive Analysis of Web-Scale Datasets," 36th International Conference on Very Large Data Bases, Sep. 13-17, 2010, Singapore, Proceedings of the VLDB Endowment, vol. No. 1.
NYSE Technologies Website and Fact Sheet for Data Fabric 6.0 Aug. 2011, https://web.archive.org/ web/20110823124532/http://nysetechnologies.nyx.com/data-technology/data-fabric-6-0.
Richardson, Alexis, "Introduction to RabbitMQ, An Open Source Message Broker That Just Works," Rabbit MQ, Open Source Enterprise Messaging, pp. 1-36, May 13, 2009.
Stefan Theuβl, "Applied High Performance Computing Using R," Diploma Thesis, Univ. Prof, Dipl, Ing. Dr. Kurt Hornik, pages 1-126, Sep. 27, 2007.
STIC search dated Jan. 04, 2019 (Year 2019).
Telematics Set the Stage the Improved Auto Claims Management by Sam Friedman (Oct. 10, 2012); 3 pages.
Wang, Guohul et al., "Programming Your Network at Run-time for Big Data Applications," IBM T.J. Watson Research Center, Rice University, HotSDN'12, Aug. 13, 2012, Helsinki, Finland.
Wang, Jianwu et al., "Kepler + Hadoop: A General Architecture Facilitating Data-Intensive Applications in Scientific Workflow Systems," WORKS 09, Nov. 15, 2009, Portland, Oregon, USA.
Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.
Xi et al., "Enabling Flow-Based Routing Control in Data Center Networks using Probe and ECMP," Polytechnic Institute of New York University, IEE INFOCOM 2011, pp. 614-619.
Zevnik, Richard. The Complete Book of Insurance. Sphinx. 2004. pp. 76-78.

\* cited by examiner

SYSTEM AND METHOD FOR PERFORMING DWELLING MAINTENANCE ANALYTICS ON INSURED PROPERTY

CROSS REFERENCE TO RELATED APPLICATIONS

This application is a divisional of U.S. patent application Ser. No. 14/273,877 which claims priority to U.S. Patent Application Ser. Nos. 61/886,779 filed Aug. 16, 2013; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to performing maintenance analytics and claim initiation using informatics sensor data.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who then contacts his or her insurance company to inform them that there has been a loss. However, the loss could be mitigated with automated warning and detection systems that interface with the insurance company systems. For example, homeowners may not become aware of minor to medium hail damage to their roofs until such time as that damage leads to water damage to the exterior or interior of the home. If they could be made aware of such loss events earlier and then take corrective actions, then the increased damage and loss could have been mitigated or avoided.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, provided is a computer device and method for processing maintenance related data for performing maintenance analytics on insured property. Informatic data is received from one or more sensor devices relating to property covered by an insurance policy. Analysis is performed on the received informatic data to determine one or more conditions associated with the insured property. Predefined business rules are applied using the determined one or more conditions associated with the insured property to determine a maintenance profile for the property indicating one or more of maintenance history and repairs or maintenance requirements for the property.

In another aspect an insurance policy associated with the insured property is electronically received and analyzed to determine insurance coverage applicability for the repairs or maintenance requirements indicated in the maintenance profile.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
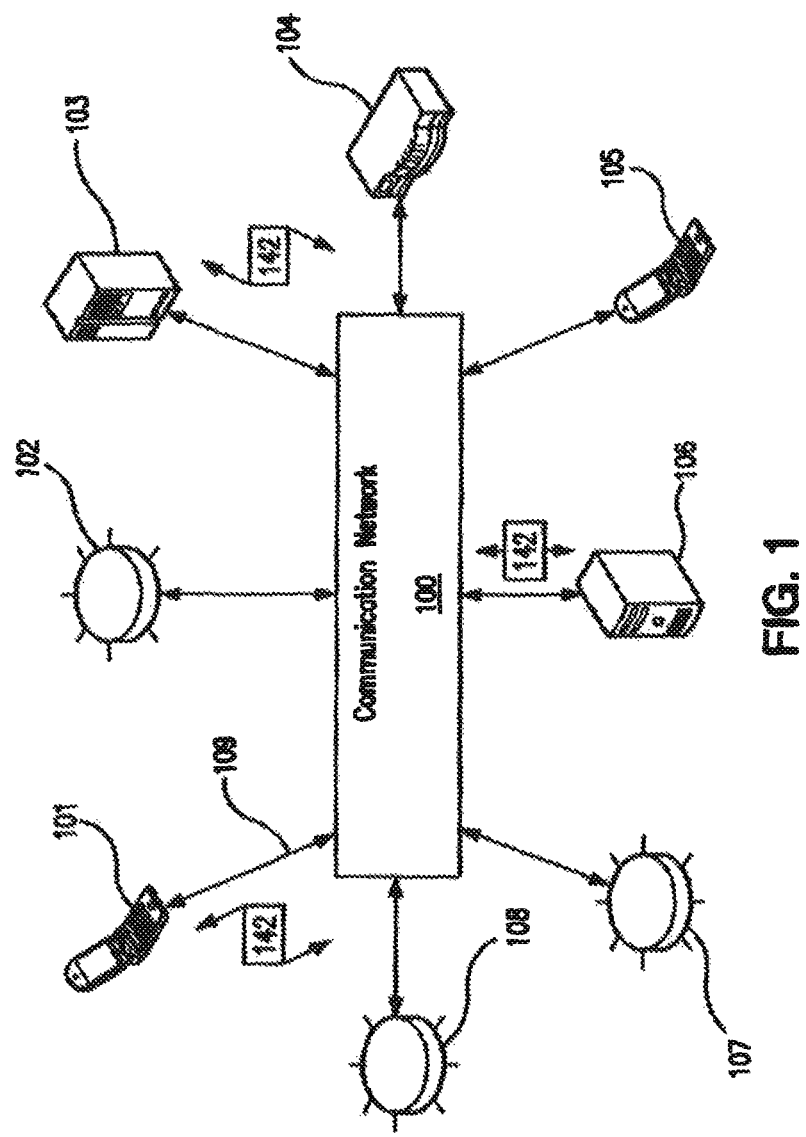
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "maintenance related data" refers to data or information that may indicate or suggest that repairs or maintenance may be needed now or in the future to a building, insured property, or other structure, or the premises or grounds where a building, insured property, or other structure is located.

As used herein, "insured property" means a dwelling, other buildings or structures, personal property, or business property that may be covered by an insurance policy.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
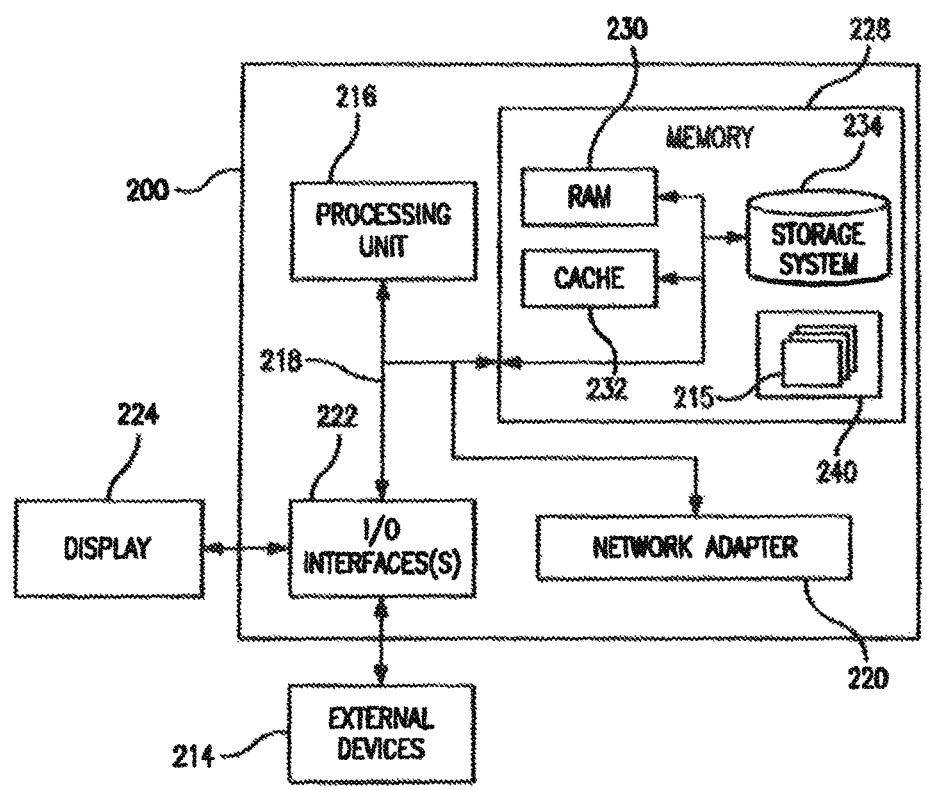
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as insured property analyzer module 306 and maintenance manager module 308 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
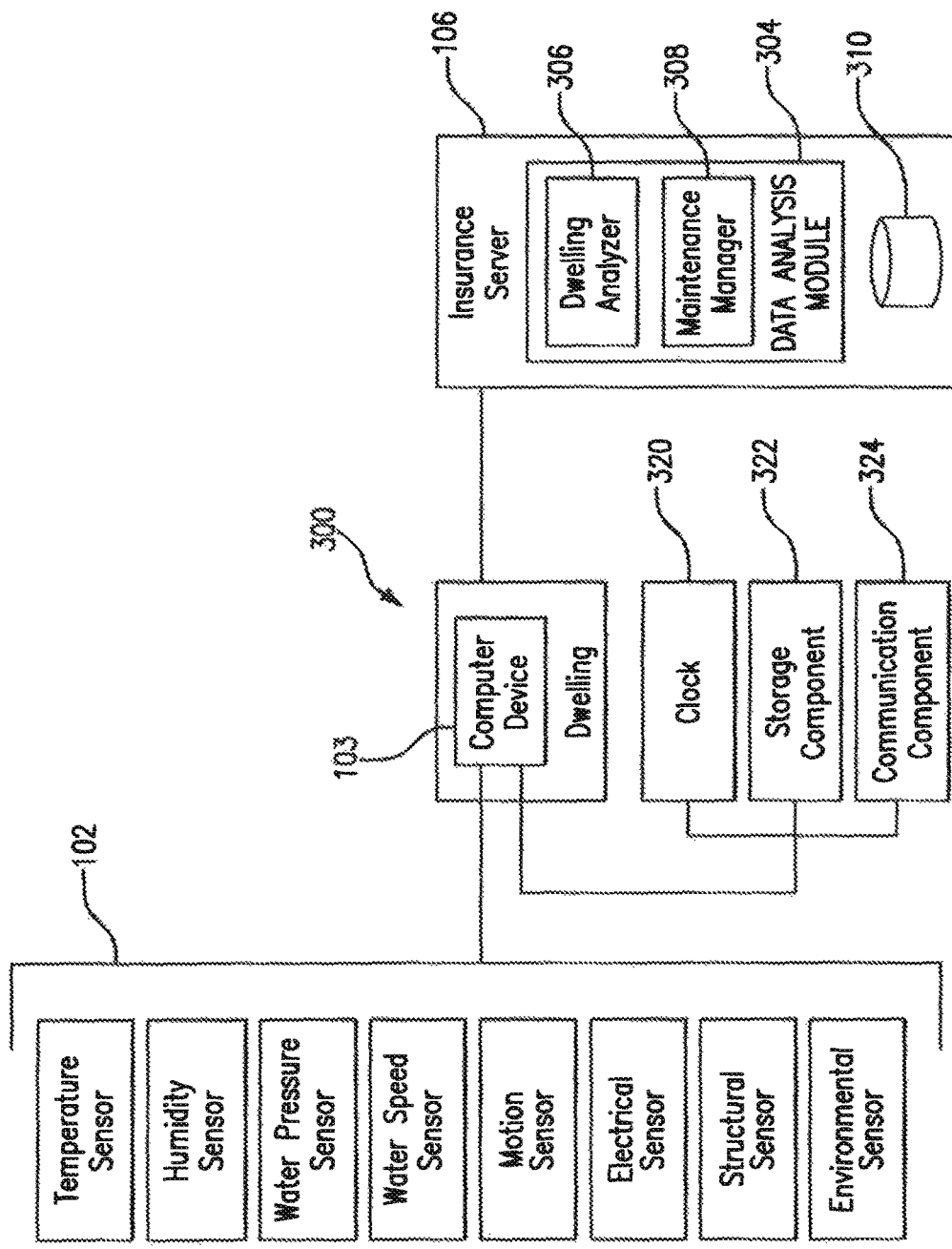
FIG. 3 is a block diagram of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of insured property structure (e.g., residential, commercial, retail, municipal, etc.) in which the capture and analysis of sensor data (102) is useful for the reasons at least described below. Insured property 300 preferably includes a computing device 103 for capturing data from a plurality of sensors 102 which capture data regarding various aspects of insured property 300, as further described below. It is to be understood insured property computing device 103 may be located in any location, and its position is not limited to the example shown.

Computing device 103 is preferably configured and operational to receive (capture) data from various sensors 102 regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably controlled by an insurance company/carrier, may perform such analytics, as also further described below. It is also to be understood in other embodiments, data from sensors 102 may be transmitted directly to remote server 106, via network 100, thus either obviating the need for insured property computing device 103 or mitigating its functionality to capture all data from sensors 102.

In the illustrated embodiment of FIG. 3, insured property computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300.

Humidity readings from one or more locations inside and/or outside the insured property could thus be recorded by device 103.

Water Sensor(s)/Water pressure sensor(s)—configured and operational to preferably monitor water related conditions, including (but not limited to): the detection of water and water pressure detection, for instance in the plumbing system (including water lines, sewer lines, HVAC system, appliances, automatic fire suppression systems, sprinkler systems, and sump pumps) in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time.

Water Detection sensor—configured and operational to preferably monitor water leaks or moisture in or from the plumbing system in the insured property 300. Water detection sensor may have one or more probes/sensors attached to various locations of the insured property's 300 plumbing, and thus device 103 may record a potential water leak or area of moisture buildup in the structure.

Wind speed sensor—configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model for various purposes.

Motion sensor—configured and operational to sense motion in the insured property 300 to which device 300 is attached. Typically, insured property's 300 do not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the building, insured property, or other structure.

Electrical system sensor/analyzet—configured and operational to assess the condition of the electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Still other types of electrical measurements could be determined include how energy is used and at what times of day it is used, etc. Any type of data about the insured property's 300 electrical system could be captured by device 103. An analysis model could use the information about electrical energy in various ways.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While a insured property 300 normally does not move, positional sensor may allow device 103 to be recovered in the event of a catastrophe. For example, if an insured property 300 explodes, or is otherwise catastrophically damaged, device 103 may be propelled to an unknown location. Positional sensor may indicate the geographical area of an insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the insured property 300 could thus be recorded by device 103 and used by an analysis model in various ways.

Environmental Sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance Sensor—configured and operational to preferably detect various operating parameters relating to appliances within an insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.) electrical generator system, pool filtration and heating system, garage door openers, sump pump and water well system, septic tank system, garage door opener, etc. An appliance sensor may comprise detection hardware, or may employ one or more remote probes, which may be located inside and/or outside the insured property 300 functional to detect certain operating parameters of appliances. Operating parameters detected by an appliance sensor 300 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more insured property appliances could thus be recorded by device 203 and used by an analysis model in various ways. Image Sensor—configured and operational to obtain image information regarding the subject property within insured property 300. Examples of image sensors include (but are not limited to) visible light cameras, infrared cameras, two-dimensional (2D) cameras, three-dimensional (3D) cameras, radar-capable sensors, sensors that detect other wavelengths, and/or any combination thereof.

With exemplary sensors 102 identified and briefly described above, and as will be further discussed below, it is to be generally understood sensors 102 preferably record certain data parameters relating to products and services provided or potentially provided by an insurance carrier, such as USAA, to perform insured property maintenance analytics and claim initiation as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either an insured property computer system (e.g., device 103) or via an external computer environment (e.g., server 106). Additionally, it is to be understood data packets collected from sensors 102 can be aggregated in insured property computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when insured property Internet service is nonfunctioning).

In accordance with an illustrated embodiment, in addition to the aforementioned, the sensors 102 being utilized relative to insured property 300, insured property computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently capture images of various portions of the structure of insured property 300, etc., and may timestamp each reading and each image. The time at which the readings are taken may be used to reconstruct events or for other analytic purposes, such as those described below. For example, the environmental sensor may measure the presence of mold/bacteria/algae/lead paint or any contaminant adverse to human health. The timestamps on air quality readings taken after a recent water incident may help determine how long does it take for mold to grow after water damage occurs.

A storage component 322 may further be provided and utilized to store data readings and/or timestamps in device 103. For example, storage component 322 may comprise, or may otherwise make use of, magnetic or optical disks, volatile random-access memory, non-volatile random-access memory or any other type of storage device. There may be sufficient data storage capacity to store several days or several weeks worth of readings. For example, there might be various plumbing issues which can affect the water pressure in a plumbing system to be low. Storage component 322 might have sufficient storage capacity to allow, for example five days of readings to be stored, thereby allowing narrowing down the cause of low water pressure.

A communication component 324 may further be provided and utilized to communicate recorded information from insured property computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from insured property computing device 103 to learn about risks, repair needs and other analytics relative to maintenance of insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for insured property computing device 103.

In the example of FIG. 3, communication component 324 (which is shown, in FIG. 3, as being part of, or used by, insured property computing device 103) communicates data to server 106. Server 106 may comprise, or otherwise may cooperate with, a data analysis module 304, which may analyze data in some manner. Data analysis module 304 may comprise various types of sub-modules, such as insured property analyzer 306 and maintenance manager 308. In general, insured property analyzer 306 may perform an analysis of collected data regarding various attributes of insured property 300, such as, for example, but not limited to, one or more utility systems associated with the insured property 300, structural condition of the insured property 300 and environmental conditions detected in the vicinity of the insured property 300. In various embodiments of the present invention, insured property analyzer 306 may analyze data to detect an occurrence of a natural peril event, determine repair and maintenance needs for insured property 300, generate maintenance profile for insured property 300, and the like. In general, maintenance manager 308 may perform an analysis of maintenance profile generated by insured property analyzer 306 and may perform an analysis of an insurance policy associated with the insured property 300. Moreover, maintenance manager 308 may initiate a potential insurance claim related to one or more identified repair and/or maintenance needs. Server 106 may further comprise, or otherwise may cooperate with, a claim system repository 310, which may store various claim related data and information.

Figure 4:
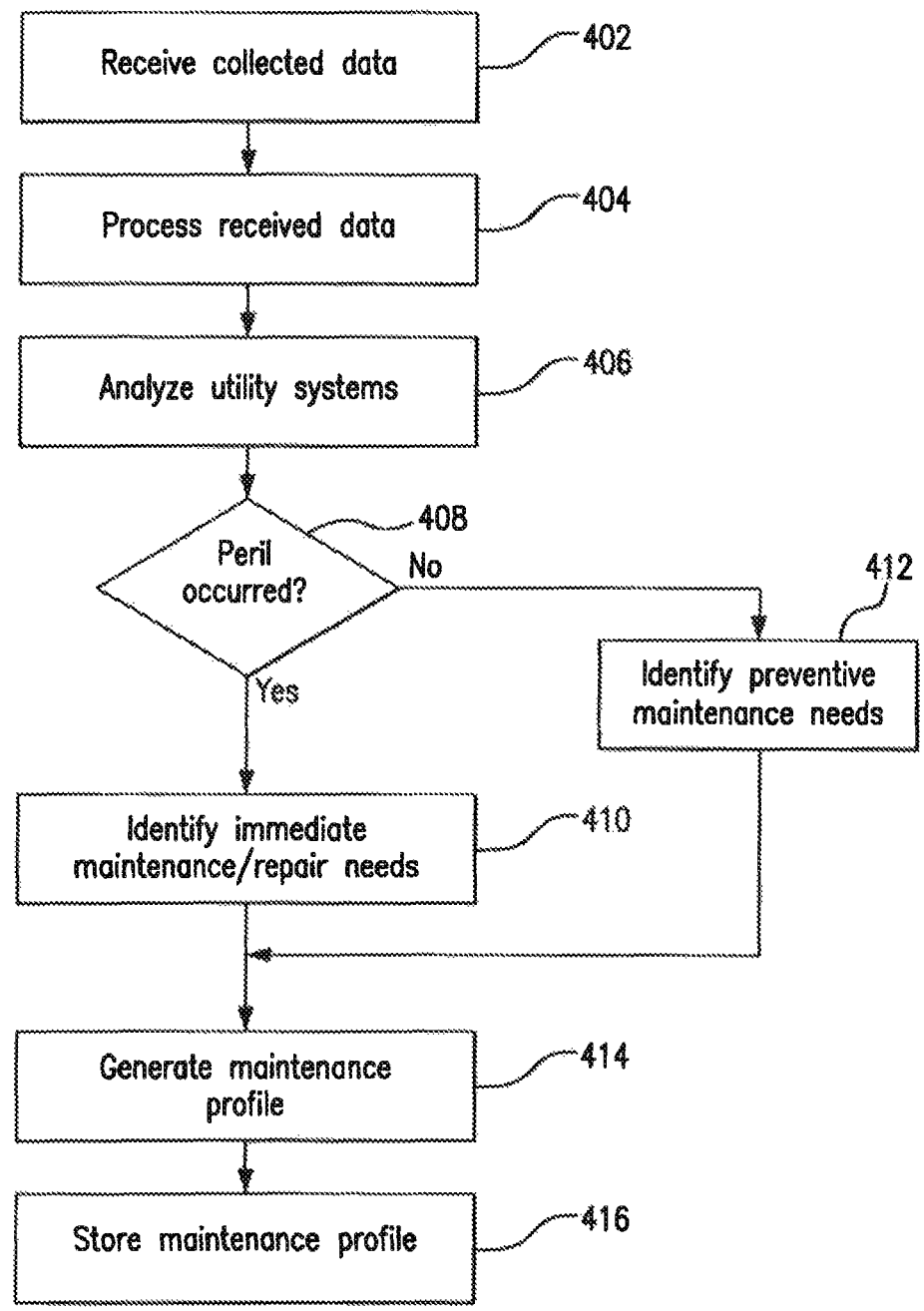
FIG. 4 is a flow diagram of operational steps of the insured property analyzer module of FIG. 3 in accordance with an illustrated embodiment.
Figure 5:
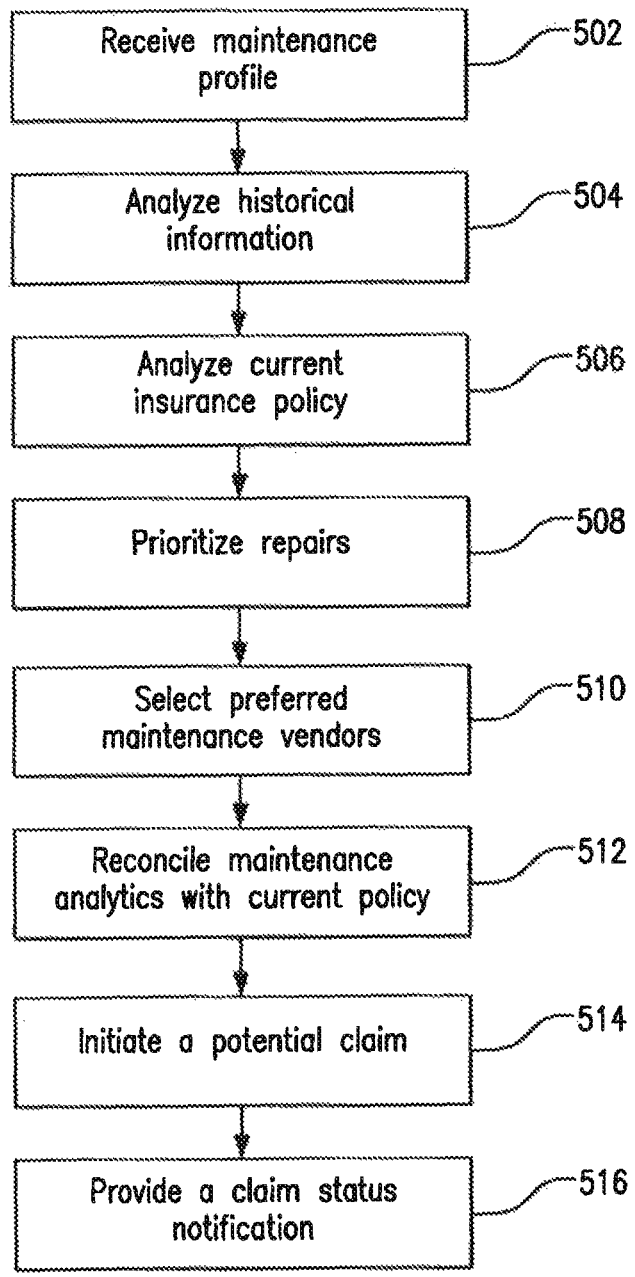
FIG. 5 is a flow diagram of operational steps of the maintenance manager module of FIG. 3 in accordance with an illustrated embodiment.

FIGS. 4 and 5 show, in the form of a flow chart, exemplary operational steps of the insured property analyzer 306 and maintenance manager 308. Before turning to descriptions of FIGS. 4 and 5, it is noted that the flow diagrams shown therein are described, by way of example, with reference to components shown in FIGS. 1-3, although these operational steps may be carried out in any system and are not limited to the scenario shown in the aforementioned figures. Additionally, the flow diagrams in FIGS. 4 and 5 show examples in which operational steps are carried out in a particular order, as indicated by the lines connecting the blocks, but the various steps shown in these diagrams can be performed in any order, or in any combination or subcombination.

With reference to FIG. 4, at 402, insured property analyzer 306 preferably collects data from sensors 102. In an embodiment of the present invention, this step may involve computing device 103 periodically contacting (via network 100), at prescribed time intervals, data analyzer component 304 running on server 106 to send accumulated data. In an alternative embodiment, contact between the insured property computing device 103 and insured property analyzer 306 may be initiated when the insured property analyzer 306 contacts the insured property computing device 103. Following the initial contact, insured property analyzer 306 may receive data from the insured property computing device 103. It is to be understood data packets collected from sensors 102 can be aggregated in insured property computing device 103 and sent as an aggregated packet to insured property analyzer 306 for subsequent analysis.

At 404, insured property analyzer 306 preferably processes the received data. For example, insured property analyzer 306 may include a parser configured to parse the aggregated packet and classify the received data based on, for example, type of sensor employed to collect a particular subset of the received data. Insured property analyzer 306 may create a data structure for each classification. This step may further involve identifying a policy associated with insured property 300 from which the received data is collected.

At 406, insured property analyzer 306 preferably periodically monitors one or more utility systems associated with the insured property based on the received informatics data. The monitored utility systems may include but are not limited to electrical wiring system, plumbing system, central heating system, and the like. The monitored utility systems may be incorporated into the structure of insured property 300. For example, electrical system sensors may be connected to various points in the insured property's 300 electrical system to measure voltage. Insured property analyzer 306 may use readings from the electrical system sensors to determine if the voltage is persistently too high, or too low, or if the voltage frequently drops and/or spikes. Such conditions may suggest that the insured property 300 is at risk for fire. As another non-limiting example, this step may further involve periodically checking informatics data related to the components of the insured property's 300 plumbing system to detect any water leaks. Generally, water leaks could cause damage to some parts of the insured property's 300 structure. Damages to the insured property structural elements could cause the insured property 300 to deteriorate, collapse, or cause injuries to its occupants.

At 408, insured property analyzer 306 preferably processes the informatics data collected by a plurality of sensors 102 to assess environmental conditions related to the insured property 300. Environmental conditions may include, but are not limited to: temperature conditions, wind conditions, humidity, air quality present in the insured property 300, humidity present in the insured property 300, and so forth. In various embodiments of the present invention, the plurality of sensors 102 measuring and/or collecting environmental informatics data may include one or more of temperature sensors, humidity sensors, sound sensors, wind speed sensors, environmental sensors, and so on. In an embodiment of the present invention, insured property analyzer 306 may analyze the collected data to detect an occurrence of a natural peril event based on the received informatics data. As used herein, the term "peril" refers to a cause of loss. By way of example, such perils (or peril events) may include, but are not limited to a hail, a hurricane, water damage, a fire, and the like.

At 410, in response to detecting an occurrence of one or more natural peril events (step 408, yes branch), insured property analyzer 306 preferably conducts an analysis to identify certain immediately needed repairs to the structure of an insured property 300. For example, this step may involve monitoring structural condition of the insured property 300. As a result, insured property analyzer 306 may detect, for example, a hole in the roof of insured property 300 (via one or more sensors 102), requiring immediate repair. As another example, an environmental sensor may have detected a gas leak or any contaminant adverse to human health. As yet another example, insured property temperature analysis may have indicated a malfunctioning cooling/heating system. In general, any insured property condition caused by the natural peril event that affects the residents' health or safety may be considered by insured property analyzer 306 as requiring an immediate repair.

If insured property analyzer 306 does not detect an occurrence of any natural peril events (step 408, no branch), at 412, insured property analyzer 306 preferably conducts an analysis to identify certain preventive repairs to the structure of an insured property 300. For example, based upon certain analysis, insured property analyzer 306 may recommend preventive maintenance to the roof an insured property 300 (e.g., detection of wind, moisture, improper roof slope line, etc.). For instance, insured property analyzer 306 may identify one or more structural changes by analyzing the condition of the wall structure, floor structure, ceiling structure and roof structure of the insured property 300. In one implementation, insured property analyzer 306 may perform this identification by comparing latest measurements of the slope of a floor/wall/ceiling with previously taken measurements. As another example, based upon analysis of a plumbing system, insured property analyzer 306 may have detected long-term stress on pipes. In order to prevent water leaks, insured property analyzer 306 may recommend reducing water pressure (e.g., by installing a water softener) to prevent future plumbing leaks. As another example, based upon, for example, an air flow analysis, insured property analyzer 306 may have detected that damaged frames and/or dividers allow air leaks into insured property insured property 300. Thus, insured property analyzer 306 may make recommendations with regards to window replacement/repair needs.

According to an embodiment of the present invention, at 414, insured property analyzer 306 may generate a maintenance profile corresponding to the insured property 300 based on the received informatics data and based on the analysis performed at 406-412. The maintenance profile may include both urgent and essential repair needs. For example, the generated maintenance profile may indicate that electrical wiring system is so old that it needs an immediate upgrade. As another example, the maintenance profile may point out that gas heating boiler has not received its annual service. In addition, the maintenance profile may include forward maintenance plans, for instance, for the next five to seven years, establishing, for example, the date of the next re-painting job, the date of the next windows replacement job, and the like. Furthermore, the generated maintenance profile may include detailed information about all necessary and planned repairs.

In an embodiment of the present invention, upon generation of the maintenance profile, insured property analyzer 306 may store the generated maintenance profile in the claim system repository 310 (which is shown, in FIG. 3, as being part of, or used by, insurance server 106). The claim system repository 310 may comprise a database or any other suitable storage component. For example, the suitable storage component may comprise, or may otherwise make use of, magnetic or optical disks, volatile random-access memory, non-volatile random-access memory or any other type of storage device.

FIG. 5 is a flow diagram of operational steps of the maintenance manager module of FIG. 3 in accordance with an illustrated embodiment. At 502, maintenance manager 308 preferably retrieves the maintenance profile corresponding to the insured property 300 generated by the insured property analyzer 306 from the insurance server's 106 claim system repository 310. In an alternative embodiment of the present invention, this step may involve the maintenance manager 308 receiving the maintenance profile directly from the insured property analyzer 306. Next, maintenance manager 308 preferably maps the received/retrieved data to a particular insurance policy associated with the insured property 300.

Next, at 504, maintenance manager 308 preferably analyzes historical information related to maintenance of the insured property 300. For example, maintenance manager 308 may determine a total number of completed repairs over a predetermined period of time (e.g., one year). As another example, maintenance manager 308 may analyze historical data to determine average annual cost of repairs associated with the insured property 300. The analyzed historical data may also help maintenance manager 308 to determine the effectiveness of previously performed maintenance related repairs. The foregoing examples of historical data are illustrative only and are not intended to be in any way limiting. It is noted that historical information described herein may be collected by data analysis module 304 and may be stored at the insurance server's 106 claim system repository 310.

At 506, maintenance manager 308 analyzes the insurance policy associated with the insured property 300 to further assess insured property coverage. Typically, a standard home insurance policy does not cover issues related to maintenance. For example, damage resulting from normal wear and tear or deterioration with age is not covered. Generally, standard home insurance policy protects a policyholder from sudden and accidental, direct physical loss to tangible property caused by perils such as wind, hail, lightening, or fire. Keeping an insured property well maintained and safe for others is policyholder's responsibility, and a home insurance company typically does not owe for maintenance related items. However, additional coverage or a different type of coverage, such as a service or maintenance contract, could be offered by an insurance company.

Optionally, at 508, maintenance manager 308 may evaluate the list of all urgent and essential repairs that may be contained in the maintenance profile to prioritize such repairs based on, for example, the insurance policy, other product, or service contract associated with the 300. For instance, maintenance manager 308 may establish, for example, the date of the next re-painting job, the date of the next windows replacement job, and the like. According to an embodiment of the present invention, maintenance manager 308 may set optimum times for major improvements in the insured property 300, such as renovating the bathroom or kitchen or replacing the plumbing. Advantageously, maintenance manager 308 may estimate optimum times for performing repairs/renovations by correlating captured informatics sensor data related to the insured property 300 with the corresponding insurance policy.

At 510, maintenance manager 308 preferably selects one or more preferred maintenance/repair vendors. Maintenance/repair vendors are separate entities, each with the capability to perform a particular type of repair. For example, one vendor may specialize in restoration work on roofing, siding, gutters and windows. Another vendor may have the capability to repair and fix the gas leak. Thus, maintenance manager 308 may select one or more preferred vendors based, at least in part, on data collected from sensors 102. In an embodiment of the present invention, the preferred vendors can have exclusive capabilities, meaning that the capability to handle any one particular repair by one vendor is not shared by the remaining vendors. In an alternative embodiment, the preferred vendors can have nonexclusive capabilities, meaning that the capability to handle any one repair service by any one vendor is shared by one or more remaining vendors. Moreover, the capabilities of various vendors to handle the same type of repair may involve different technologies and charges (i.e., costs). The preferred vendor list may be stored, for example, in claim system repository 310.

At 512, maintenance manager 308 may reconcile maintenance analytics performed at steps 504 with the insurance policy associated with the insured property 300. For example, maintenance manager 308 may recommend changes to the insurance policy in light of repairs actually performed (i.e., roof replacement coverage, interior plumbing and drainage coverage, and the like). As another example, maintenance manager 308 may select a different vendor to perform specific repairs by reconciling vendors' estimated charges, fee structures, with coverage provided by the insurance policy, other product, or service contract.

At 514, maintenance manager 308 may send a request to initiate a claim to an insurance company claim system (which is not shown in FIG. 3, but may be a part of, or used by, insurance server 106). Such a request may be received on a device associated with the claim system, such as insurance server 160, or any other device capable of receiving a request for the initiation of an insurance claim. The request sent by maintenance manager 308 to the claim system may include information relevant to maintenance/repair and/or insurance policy associated with the insured property 300. For example, maintenance manager 308 may be configured to provide insurance policy identification, maintenance profile, preferred vendor's identification and/or any other information that may be of use in initiating an insurance claim. All such information is contemplated as within the scope of the present disclosure.

At 516, maintenance manager 308 preferably provides a claim status notification based on the request sent to the insurance company claim system (at 514). It is to be appreciated that policy analyzer 308 may also be configured to electronically deliver all notifications regarding planned and/or recommended repairs. The notification can be anything that advises a policy holder, device, or computer system of the insured property maintenance and claim initiation related activities, including but not limited to, a display of text on a local display screen, a message in an email sent to a local or remote computer, a text message, a communication to a remote computer system. The electronic delivery may include integration of notification functionalities. It is to be also understood and appreciated that maintenance manager 308 may be configured and operational to integrate with policy holder's communicative computing devices (e.g., smart phones (via an app), computers, tablets, smart TV's, vehicle communication systems, kitchen communication systems, etc.) for sending such notifications. In an embodiment of the present invention, each notification may include, but not limited to, information related to immediate repair needs, recommended time period for performing major insured property improvements, information related to one or more preferred maintenance/repair vendors (for example, selected at 510), information related to a claim status, and the like. Additionally, maintenance manager 308 may save the aforementioned claim status and/or repair recommendations in the insurance server's 106 claim system repository 310.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A sensor system for capturing data, the system comprising:
a plurality of sensor devices each configured to capture a different attribute of a property, each sensor device having a transmitter with an associated IP address coupled to a wireless network for transmitting the captured data, each sensor device configured to periodically capture data corresponding to a different attribute of the property in accordance with a data capture frequency value, the plurality of sensor devices comprising at least a humidity sensor device configured to measure humidity data associated with the property and a structural sensor device configured to measure data associated with structural stability of the property;
a data storage component wirelessly coupled to each of the plurality of sensors devices via the IP address of the transmitter for each of the sensor devices, wherein the data storage component is configured to aggregate captured data regarding different attributes of the property received from each of the sensor devices;
a communication component coupled to the data storage component, the communication component configured to encrypt and transmit the aggregated captured encrypted data via the wireless network;
a computer management module coupled to the communication component device, via the wireless network, and programmed to:
receive a first set of captured encrypted data from the communication component regarding the various attributes of the property;
analyze the first set of captured encrypted data regarding the various attributes of the property to generate a maintenance profile associated with the property, the maintenance profile comprising previously recorded data associated with at least one attribute of the property;
upon detecting a maintenance event relating to the property based on humidity data captured by the humidity sensor device, generate an instruction to collect attributes relating to the maintenance event;
transmit the instruction to the structural sensor device, wherein the instruction increases a data capture frequency value of the structural sensor device;
upon transmitting the instruction, receive a second set of captured encrypted data from the structural sensor device, the second set of encrypted data comprising data associated with structural stability of the property;
using the maintenance profile and the second set of captured encrypted data, determine if second set of captured encrypted data deviates from previously recorded structural stability data of the property in response to determining a deviation, identify a repair event;
identify an optimal time period to make repairs or modifications to the property;
generate an electronic message comprising a notification corresponding to the maintenance event and the repair event; and
transmit the electronic message to a computing device associated with the property.

2. A sensor system as recited in claim 1, wherein the maintenance event is related to at least one of an electrical wiring system, a plumbing system and a HVAC system associated with the property.

3. A sensor system as recited in claim 1, wherein the plurality of sensor devices further comprises one or more of the following detection sensor devices: temperature; water; wind speed; motion; electrical; environmental; appliance and camera.

* * * * *